US009976033B2

(12) United States Patent
Luccarelli et al.

(10) Patent No.: US 9,976,033 B2
(45) Date of Patent: May 22, 2018

(54) VOC-FREE ASPHALT-BASED COMPOSITIONS

(71) Applicants: Charles J. Luccarelli, New Canaan, NY (US); Dario Amicucci, Armonk, NY (US)

(72) Inventors: Charles J. Luccarelli, New Canaan, NY (US); Dario Amicucci, Armonk, NY (US)

(73) Assignee: GREENROOF MATERIALS LLC, Mount Vernon, NY (US)

( * ) Notice: Subject to any disclaimer, the term of this patent is extended or adjusted under 35 U.S.C. 154(b) by 0 days. days.

(21) Appl. No.: 13/923,064

(22) Filed: Jun. 20, 2013

(65) Prior Publication Data

US 2014/0373754 A1  Dec. 25, 2014

(51) Int. Cl.
| | |
|---|---|
| *C08L 95/00* | (2006.01) |
| *C08K 3/34* | (2006.01) |
| *C08K 5/17* | (2006.01) |
| *C08J 3/09* | (2006.01) |
| *C08K 7/02* | (2006.01) |
| *C09D 195/00* | (2006.01) |

(52) U.S. Cl.
CPC .............. *C08L 95/00* (2013.01); *C08J 3/091* (2013.01); *C08K 3/346* (2013.01); *C08K 5/175* (2013.01); *C08K 7/02* (2013.01); *C09D 195/00* (2013.01); *C08J 2395/00* (2013.01)

(58) Field of Classification Search
CPC .. C08L 95/00; C08L 2666/26; C08L 2666/64; C08L 2666/72; C08L 2666/78
See application file for complete search history.

(56) References Cited

U.S. PATENT DOCUMENTS

| | | | | |
|---|---|---|---|---|
| 1,658,540 A * | 2/1928 | Sutherland | ............. | C08L 95/00 106/248 |
| 3,407,165 A * | 10/1968 | Hendrikus | .......... | C04B 20/0076 260/998.15 |
| 4,248,926 A * | 2/1981 | Tajima | ................... | B32B 11/02 428/343 |
| 5,340,391 A | 8/1994 | Grzybowski | | |
| 5,391,417 A * | 2/1995 | Pike | ......................... | E04D 5/02 106/705 |
| 5,529,621 A * | 6/1996 | Hudson | .................. | C08L 95/00 106/278 |
| 5,622,554 A * | 4/1997 | Krogh | ................ | C09D 195/00 106/284.06 |
| 5,693,133 A * | 12/1997 | Largent | .................... | C08K 5/17 106/284.06 |
| 5,730,791 A | 3/1998 | Krogh et al. | | |
| 6,248,396 B1 * | 6/2001 | Helf | ......................... | C08K 5/01 427/136 |
| 6,306,937 B1 | 10/2001 | Fields | | |
| 6,495,074 B1 * | 12/2002 | Carr | ........................ | B29C 73/02 106/244 |
| 6,695,902 B2 | 2/2004 | Hemmings | | |
| 6,706,787 B1 * | 3/2004 | Burris | .................. | C08L 95/005 524/59 |
| 6,764,542 B1 | 7/2004 | Lackey | | |
| 6,776,833 B2 * | 8/2004 | Yap | ........................ | C08K 3/34 106/277 |
| 6,786,962 B2 * | 9/2004 | Yap | ........................ | C08K 3/34 106/277 |
| 6,858,315 B2 | 2/2005 | Kahn | | |
| 7,037,955 B2 | 5/2006 | Timcik | | |
| 7,119,135 B2 * | 10/2006 | Neimann | ................. | C09D 5/32 524/313 |
| 7,238,230 B1 * | 7/2007 | Moss et al. | ............ | 106/284.02 |
| 8,137,451 B2 * | 3/2012 | Aerts | ..................... | C09J 195/00 106/248 |
| 2002/0013402 A1 | 1/2002 | Fisher | | |
| 2003/0183127 A1 | 10/2003 | Yap et al. | | |
| 2010/0199886 A1 * | 8/2010 | Day et al. | .................. | 106/273.1 |
| 2011/0274487 A1 * | 11/2011 | Sylvester | ............... | C08L 95/00 404/72 |
| 2015/0376456 A1 | 12/2015 | Luccarelli et al. | | |

FOREIGN PATENT DOCUMENTS

| | | |
|---|---|---|
| EP | 1811004 A1 | 7/2007 |
| KR | 101253524 B1 | 4/2013 |
| WO | 2014204851 A1 | 12/2014 |

OTHER PUBLICATIONS

Chen, C. (2005). "Quantifying Antistrip Additives in Asphalt Binders and Mixes".*
Search Report dated Oct. 2, 2014.
UK Search Report dated Mar. 15, 2017.

* cited by examiner

*Primary Examiner* — Jennifer A Smith
*Assistant Examiner* — Alexandra M Moore
(74) *Attorney, Agent, or Firm* — Tarter Krinsky & Drogin LLP

(57) ABSTRACT

Asphalt-based compositions that contain little or no VOCs. The compositions are particularly useful for roofing applications, including as plastic roofing cement, flashing cement, roof coatings, and primers. The compositions include asphalt, a VOC-free solvent, a surfactant and clay. The compositions may also include fibers, technical or functional fillers, and a wet surface adhesion additive. The compositions may further include aluminum flakes for enhanced durability, strength, reflectivity and colorants for enhanced appearance.

16 Claims, No Drawings

VOC-FREE ASPHALT-BASED COMPOSITIONS

BACKGROUND OF THE INVENTION

Asphalt-based compositions are used in a variety of construction and building applications. These applications include coating, sealing, waterproofing, joining, cementing, and repairing components such as roofing, walls, footings, and foundations. Such compositions are often referred to as adhesives, cements, mastics, caulking, sealants, primers and coatings.

Asphalt-based compositions are also useful for roofing applications, including the construction or repair of built-up roofs, as saturants used with asphalt roll-roofing, for sealing parapet walls and roof penetrations, and for repairs to and sealing of flashings and gutters. Asphalt compositions may also be used for repair of asphalt shingles, and filling of cracks and nail holes in shingles.

To be commercially useful, such compositions should be durable, easy to apply in a variety of conditions, and relatively inexpensive. Existing asphalt-based roofing composition are typically sold in tubs (ranging from one gallon to 55 gallons) and tubes, and can be applied via trowel or with a caulk gun dispenser.

There are other specialty applications for asphalt-based compositions, including, for example, joint and crack fillers, waterproofing and damp-proofing applications, and tank and pipeline coatings. Compositions designed for such applications typically have their own set of requirements, and are manufactured to meet different ASTM standards.

Asphalt-based roofing compositions are available in a wide variety of grades, typically for use in different applications and temperatures. For built-up roofs, grade is described in ASTM D312 according to the material softening point. Specifically, a Type I roofing asphalt has a low softening point and is considered a soft composition. A Type IV roofing asphalt has a high softening point and is considered a hard composition. These, and intermediate grade compositions, are based on the susceptibility of the asphalt to flow at stated roof temperatures and slopes.

Asphalt-based compositions for roofing and other applications include a solvent to keep the composition soft and pliable, so that it can be readily applied. Once applied, the solvent evaporates, leaving residual asphalt and other ingredients in the compositions. Although the solvents vary depending on the manufacturer, grade, and intended application, existing products employ solvents such as naphtha, kerosene, gasoline, and fuel oil. These compounds are known as volatile organic compounds (VOCs), which contain carbon and evaporate (become a vapor) or "off-gas" at room temperature. Additional VOC solvents include benzene, xylene, methylene chloride, hexane, toluene, trichloroethane, styrene, heptane, methyl-ethyl ketone, butyl acetate and perchloroethylene.

For example, EP1811004 to Kelly et al. discloses asphalt-based compositions comprising asphalt, solvent, clay, and a propoxylated alcohol-based ether amine salt surfactant. The disclosed compositions utilize solvents that contain VOCs.

Moss et al., U.S. Pat. No. 7,238,230, discloses asbestos-free compositions intended for use in roof construction and repair, pavement construction and repair, or as a protective coating for building surfaces. The compositions comprise asphalt, solvent, clay and a propoxylated alcohol-based ether amine salt surfactant. The disclosed compositions include solvents that contain VOCs.

Krogh et al., U.S. Pat. No. 5,730,791, discloses asbestos-free compositions comprising asphalt, solvent, clay, and a hindered acid/amine salt surfactant. The surfactant comprises an acid constituent that has at least two alkyl groups bonded to an alpha carbon and an amine constituent comprising a variety of primary, secondary and tertiary amines. Again, the solvents in the disclosed compositions contain VOCs.

In recent years, there has been widespread concern associated with the use of VOCs, which can cause environmental damage and impact human health. Accordingly, governmental agencies and environmental organizations have sought to limit their use. New regulations have limited the use of VOC containing, solvent-based products. Accordingly, there is a need for low- or no-VOC compositions, which may be described as VOC-free.

In response to concerns and regulations governing the use of VOCs, some manufacturers have introduced asphalt-based compositions that employ emulsion technology. Such technology generally involves the use of an emulsifier, which suspends asphalt particles in water or water and oil. Following application, the liquid evaporates leaving the resulting asphaltic composition. Unfortunately, use of water has certain drawbacks and limitations, including that the compositions are susceptible to freezing during storage or in use, resulting in separation of the ingredients and failure of the composition.

For all of the foregoing reasons, there is a need to develop asphalt-based compositions for roofing and other applications that are low- or no-VOC, and which do not employ emulsion-technology. Specifically, there is a need for low- or no-VOC asphalt-based compositions which can provide enhanced performance over VOC-containing compositions at a reasonable cost.

It is an object of the present invention to provide asphalt-based compositions that are environmentally safe.

It is a further object of the invention to provide asphalt-based compositions that contain biodegradable solvents that are low- or no-VOC, and which may be described as VOC-free.

It is also an object of the invention to provide VOC-free asphalt-based compositions that can be easily applied and which are useful for roofing applications, such as roofing cements, flashing cements, coatings, and primers. Depending on the composition and application, such compositions may be applied via trowel, caulk gun, or other types of applicators, in a fashion similar to existing VOC-containing compounds.

It is a further object of the invention to provide VOC-free asphalt-based compositions that exhibit good pliability, workability, flexibility and adhesion, without sagging, slipping, or disbanding under a variety of temperatures.

It is another object of the invention to provide VOC-free asphalt-based composition that may be useful for applications such as water proofing, tank lining, and pipe coating or coating of footings and foundations.

It is a further aspect of the invention to provide VOC-free asphalt-based compositions that may be manufactured in a variety of grades for use in different regions of the world, and for various environmental conditions. Such compositions may also include functional fillers to enhance thixotropic properties, fibers for strength and resilience, and aluminum flakes or colorants for appearance or to limit the absorption of heat.

It is also an object of the invention to provide a method of manufacturing compositions meeting the foregoing objects.

SUMMARY OF THE INVENTION

It is a primary object of the present invention to provide a VOC-free asphalt composition for use in roofing applications, such as a plastic roof cement or flashing cement, that comprise asphalt, a low- or no-VOC solvent, clay and a gelling surfactant. The asphalt may be AC-20 (such as Performance Grade 64-22), or another suitable asphalt. The asphalt and the solvent are blended together in a ratio of about 65:35 to about 70:30 parts asphalt to parts solvent. This mixture is then combined with a surfactant and clay to produce a suitable gel. Additional ingredients are then added to the gel to produce the final composition, which is workable at ambient temperature. The solvent is comprised of biodiesel, such as biodiesel derived from soybean oil, and contains little or no VOCs. The clay is preferably a medium-swell clay. The composition may additionally comprise fibers and a functional filler to enhance the physical properties of the composition, such as strength, thickness, lubricity, and viscosity. The composition may also additionally comprise a wet surface adhesion additive for use in wet conditions.

An alternative embodiment of this invention comprises a VOC-free asphalt-based plastic roofing cement or flashing cement composition comprising a mixture of about 65:35 to about 80:20 parts asphalt to solvent. The solvent is comprised of biodiesel, such as biodiesel derived from soybean oil, and contains little or no VOCs. This blend is further mixed with about 11% to about 13.5% clay and about 1.5% to about 2% of a gelling surfactant. The composition may additionally comprise fibers, such as fine or coarse fibers, or a mixture of fine and coarse fibers. The composition may also comprise a functional filler, and a wet surface adhesion additive.

In another embodiment, the invention is a method of preparing a VOC-free asphalt composition for use in roofing applications, including as a plastic roofing cement or a flashing cement, comprising the following steps: mixing asphalt and a low- or no-VOC solvent so as to form a blend. A gelling surfactant is then added to the blend. Clay is then added to form a gel. Additionally, if desired, fibers and a functional filler may be added to the gel with further mixing. Further steps may include the addition of a wet surface adhesion additive. The asphalt or the asphalt and solvent may be heated prior to addition of the surfactant or clay.

The compositions of the invention exhibit good pliability, workability, flexibility and adhesion, without sagging, slipping, or disbanding under a variety of temperatures. These compositions may be used on a variety of substrates, including asphalt, asphalt shingles, galvanized steel, aluminum, painted surfaces, masonry and brick. They may be used to seal roof penetrations, parapet walls, seams and joints in roofing, flashings, and cracks, and are useful on areas prone to water infiltration.

DETAILED DESCRIPTION OF THE EXEMPLARY EMBODIMENTS

Built-up asphalt roofing accounts for the majority of commercial and industrial roofing in the United States. Such roofing involves the application of alternate layers of asphalt and asphalt-impregnated materials in which asphalt is applied while hot. Such roofs are typically repaired with asphalt-based roofing compositions known as flashing, roofing cement or plastic roofing cement. Asphalt-containing roofing compositions are also used on parapet walls, for sealing roof penetrations, for repair of shingles, and for sealing gutters and flashing. Asphalt-containing compositions are also used for joint and crack filling, as sealants, as cements, and as compounds for waterproofing and damp-proofing.

The application of asphalt compositions for roofing application raises considerations of temperature susceptibility and age hardening. In particular, the temperature susceptibility of an asphalt composition is paramount when the composition is to be used in a roofing application, as the composition must not soften unduly at higher temperatures in the summer or crack at lower temperatures in the winter. The compositions must also maintain their properties over many cycles of temperature changes. Age hardening and durability are also important characteristics of asphaltic compositions used in roofing applications, as compositions must not change in dimension or crack as the solvent evaporates, or over time. The composition must be durable, and must resist disintegration under prevailing conditions of weather and exposure to sunlight.

To accommodate these needs, manufacturers typically offer different grades of compositions, with softer grades of asphalt in use in northern or colder climates, and harder grades of asphalt in use in southern or warmer climates. However, in many regions of the country, roofing compositions are exposed to extremes of both high and low temperature, leading to compromises in asphalt selection, with no particular grade of asphalt being completely suited over the entire range of actual climatic temperatures.

The present invention is directed to low- or no-VOC asphalt-based compositions, particularly suited for roofing applications such as plastic roofing cement or flashing cement, which may be said to be VOC-free. The formulations of the present invention comprise a mixture of asphalt, a VOC-free solvent, a surfactant, and clay. Fibers and technical or functional fillers may also be added to improve thixotropic properties of the composition.

Asphalt is the product of the nondestructive distillation of crude oil in petroleum refining. Asphalt is a dark brown to black, cement-like semisolid or solid. Depending on the crude oil used as a feed-stock for the asphalt, the distillation residue may be further processed, typically by air-blowing (sometimes with a catalyst) or solvent precipitation to meet performance specifications for individual applications. Asphalt is typically a mixture of paraffinic and aromatic hydrocarbons and heterocyclic compounds containing sulfur, nitrogen, and oxygen. Asphalts may also be synthesized by alternative means and materials than petroleum distillation.

Various grades of asphalts, also referred to as asphalt cement, can be used with the present invention. These include, for example, asphalts used for paving, blended asphalts, asphaltenes, and recycled asphalts. Suitable asphalts may be air blown or non-air blown. As described below, the preferred grade of asphalt is AC-20 (performance grade 64-22 neat). Paving grade asphalts may be used, and are preferred. Asphalts with low asphaltene content will have trouble forming a sufficient gel structure and, as such, the accompanying solvent may need to be adjusted to accommodate for the asphaltene content of the asphalt. Asphalts that are synthesized by means other than petroleum distillation can also be used.

The composition also includes a low- or no-VOC, sustainable, "green" solvent that is not petroleum-based. In the subject compositions, the solvent solubilizes the asphalt. In use, when exposed to atmospheric conditions, the solvent will over time evaporate, leaving the asphalt to perform its function. There are multiple sources, types and grades of suitable solvents, known as bio-oils or biodiesel, available for use in the invention. These bio-oils include oils derived from soy, palm, rape seed, canola, algae, or man-made oils. Preferred solvents include bio-oils such as soybean, and blends of bio-oils. Biodiesels that may be used for the invention also include esters derived from oils.

Different ratios of solvent to asphalt may be used within the composition, with the most preferred ratios producing compositions that conform to ASTM standards. Small quantities of water may also be added to reduce the total amount of solvent required, without degrading the performance of the resulting composition. The preferred amount of water in the composition is compliant with ASTM standards (under 3%).

The solvent may preferably be comprised of biodiesel derived from soy. Typically, the biodiesel is of grade B99 or B100, although other grades may produce satisfactory compositions. The solvent preferably contains 97% or more of biodiesel. The solvent composition may also include an adhesion agent. One suitable adhesion agent is Ad-Here 240, which is available from ArrMaz Chemical Co. The adhesion agent may comprise up to about 2% of the solvent. The solvent composition may also further include small amounts of a thinning agent, such as Safety Solve AC, which is available from ArrMaz Chemical Co. The thinning agent may comprise up to about 0.5% of the solvent.

A surfactant is also utilized in the invention. The surfactant enables the asphaltenes in the formulation to bond with the attapulgite clay to form a gel, as discussed below. The amount of surfactant appears to be important in gel formation, which depends on the clay to surfactant ratio. Notably, the ratio will vary with the type of clay utilized. Likewise, high asphaltene asphalts yield stronger gels.

Preferred surfactants include salt amines, having chain lengths of 12-20 carbons, which are corrosive and with an odor. Suitable surfactants include alkyloxyalkylamine salts such as PA-14 acetate (an isodecyloxypropyl amine acetate salt surfactant) sold by Tomah Products, Milton, Wis., and Surtech, a chlorine stable, low foaming, hydrotrope surfactant. Alkoxylated fatty amines and alkoxylated ether amines may also be suitable for use as surfactants. Suitable surfactants are available from suppliers such as AkzoNobel; Air Products & Chemicals; Surface Chemists of Florida; BASF; and ArrMaz Chemical. Surfactants may also include quaternary ammonium salts such as Arquad 2C-75 and Arquad T-50 from AkzoNobel, and Adogen 3690 sold by Witco Chemical.

The composition also includes clay, which forms a gel (chemical linkage) with select fractions of the asphalt, when added to the asphalt/solvent/surfactant mixture. The strength of the gel is dependent on the specific quantity and type of asphalt, clay and surfactant utilized in the composition. Gel formation is important to the overall characteristics of the composition, as the gel provides the desired thixotropic properties to the composition. Additional materials, such as fibers and functional fillers, may be utilized to change the properties of the gel.

It has been noted that the type, grade, and particle size of the clay is important to gel formation in the composition. Medium swell clays are preferred over high swell or low swell clays. Clays suitable for use include clays having needle shaped forms, such as attapulgite clay, which is also known as Fullers Earth and Cat Litter. The preferred clay is attapulgite clay, which is available from multiple sources, including Min-U-Gel, Millwhite, and Oil Dri Corporation. Attapulgite, a naturally occurring mineral, is a crystalline hydrated magnesium alumino-silicate with a three-dimensional chain structure that gives it unique colloidal and sorptive properties. Other clays such as the bentonite, ball, sepiolite or kaolin-type clays may be used. The preferred attapulgite clays are specifically sized after the mining process to provide a small uniform particle size with a large surface area which maximizes their efficacy to provide improved viscosities. Mixtures of clays may be used.

Formation of a stable gel structure, with a viscosity which remains generally constant to slightly increasing over time and with composition constituents that remain generally dispersed or homogenous over time, is important to manufacture of suitable formulations. For roofing applications, it is accepted and recommended that the testing and determination of gel stability be made about four weeks after manufacture.

The addition of a wet surface adhesion additive is also preferred. In the examples described below, use of a wet surface adhesion additive was found to increase adhesion to wet surfaces, which is an important property for asphalt-based compositions used as flashing cement. Suitable wet surface adhesion additives include hydroxyethyl ethylene urea, amino-methoxysilane, hydroxyl-functional polymeric DCPD polyol, chlorinated polypropylene, and polyamino-amide. The preferred wet adhesive additive is LOF 6500, available from ArrMaz Chemical Co. The wet adhesion additive was found to displace water on a damp surface, which permitted the roof cement to adhere to the repair area.

The composition may also include a functional or technical filler. Functional fillers may provide thixotropic enhancement, build viscosity, improve mechanical properties, such as anti-settling and anti-sag, and can improve stir-back. Examples of suitable functional fillers are diatomaceous earth, glass spheres, perlite (treated or untreated), fly ash, mica, and talc. Useful fillers also include sand, mica, ground slate, ground limestone, wollastonite, pearlite, cellulosic fibers, talc, and polyolefin fibers. The preferred functional filler is Sil-Cell, which is available from Silbrico Corp. Functional fillers are preferably selected for their physical characteristics of uniform particle size and spheroid particle shape, since these characteristics allow the composition to flow while also providing bulk that reduces the weight per unit volume of the finished composition.

The role of a filler can be functional, where the filler has an effect on the final properties of the product. The filler may also be non-functional, where the filler is used to bulk-out or extend other ingredients, usually to reduce cost. Non-functional fillers include silica sand, and lime dust. The preferred non-functional filler is silica sand.

Fibers may also be added to provide film reinforcement, increase tensile strength, elevate temperature flow resistance, build viscosity and provide bulk. The fibers interweave in the composition so that when applied to surfaces it stands up and does not slide or sag. Examples of suitable fibers are cellulose, glass, mineral, recycled plastic, polypropylene or Armid Kevlar/Pulpex. Fibers may be selected according to their length, diameter and ability to absorb fluids, so as to provide a final composition having the desired degree of workability and thickness. A combination of fibers may also be used, for example, a combination of coarse and fine fibers. The selection of fibers works synergistically with the selection of the other materials in the composition. Preferred fibers include cellulose fibers known as Technocel 1004/1005 and Technocel 2004, manufactured by CreoFill Fiber Corp.

Additional ingredients can include colorants, aluminum flakes, and other additives that improve adhesion, workability, ductility, and product life. For example, aluminum or other pigments may be added to the composition to improve composition aesthetics, or for their high reflectivity, which aids in thermal cooling. Such materials may also provide chemical/corrosion resistance, and improve weather-related performance resistance. Polymers such as SBS, SEBS, neoprene and polyethylene may also be added to improve high and low temperature properties, provide elastic properties, improve weathering properties, and impart chemical resistance.

The preferred ranges for the various materials within the compositions of the present invention are those that result in a formulation that is ASTM compliant. One of ordinary skill will understand that the content range for any given element of the composition can be adjusted alongside those of other components, so long as the finished composition conforms to applicable ASTM standard. For example, the formulations described in the examples conform to the current requirements of ASTM D4586, which include: moisture maximum (3%); non-volatile matter minimum (70%); asphalt (35-65%); mineral and other (15-40%); sag resistance at 60° C. (pass/none); and pliability at 0° C. (pass/no cracks).

The compositions of the present invention result in roofing cements that are environmentally safe, and are non-toxic in use and afterwards. Further, such compositions are workable at ambient temperatures, easy to apply, and can be stored over a wide range of temperatures. As a VOC-free composition, the compositions do not pose a problem with leaking petroleum, or a danger when used on a hot roof or when used simultaneously in the vicinity of hot applied or "torch-down" roofing materials. Further, the solvent of the present invention is a much less volatile material than typical VOC-containing solvents, meaning that they remain malleable over an extended period of time, which is a substantial benefit in roofing applications.

One mode for carrying out the invention is presented in terms of its preferred embodiment. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

Headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The terms "a" and "an" herein do not denote a limitation of quantity, but rather denote the presence of at least one of the referenced items.

Preparation of the Asphalt-Based Compositions

EXAMPLES

Several prototype formulations were successfully developed. These formulations comprised asphalt in combination with a bio-based solvent in ratios that included 65 parts AC-20 (Performance grade 64-22) and 35 parts bio-based solvent; 70 parts AC-20 and 30 parts bio-based solvent; and 75 parts AC-20 and 25 parts bio-based solvent.

The mixture of asphalt and solvent may contain about 65% to about 80% asphalt. The preferable asphalt:bio-solvent ratio is from about 65:35 to about 75:25, most preferably 70:30. The mixture of asphalt and solvent is then mixed with about 1.4% to about 1.7% of the surfactant, measured by weight of the final composition. Most preferably, the surfactant comprises about 1.7% of PA-14 acetate. Clay in the amount of about 10.9% to about 13.3% by weight is then slowly added to the mixture, to form a prototype gel. The most preferable clay is Min-U-Gel G35 clay.

Following gel formation, coarse fibers, fine fibers and a functional filler may be added to the gel to improve the composition. The prototype gel may comprise about 85% to about 91.1% by weight of the composition, most preferably 90% by weight of the composition. The coarse fibers can be added in the amount of from about 0% to about 5% by weight of the composition, most preferably 2% by weight of the composition. The fine fibers can be added in the amount of from about 0% to about 4% by weight of the composition, preferably 2% or 4% by weight of the composition. The functional filler may be added in the amount of about 0% to about 12% by weight of the composition, most preferably 6% by weight of the composition. In addition, the wet surface adhesive may be added in the amount of about 0.5% by weight of the composition.

Clay-gels were formed by combining the mixture of AC and solvent, with a gelling surfactant and with the clay. Additional ingredients, fibers and functional fillers were added to the gel structure to provide additional body/consistency and fibrous reinforcement for improved performance of the compositions after application. Two formulations were selected for further evaluations described in Table 1 below.

TABLE 1

| Formulations INGREDIENTS (Wt. % (g)) | | |
|---|---|---|
| | A | B |
| Asphalt/Bio-Solvent | 85 (340 g) | 85 (340 g) |
| Clay | 13.3 (53.2 g) | 13.3 (53.2 g) |
| Surfactant | 1.7 (6.8 g) | 1.7 (6.8 g) |
| Prototype Gel | 89.5 (395.6 g) | 90 (395.6 g) |
| Coarse Fiber | — | 2 (9 g) |
| Fine Fiber | 4 (17.8 g) | 2 (9 g) |
| Functional Filler | 6 (26.7 g) | 6 (26.7 g) |
| Wet Surface Additive | 0.5 (4.4 g) | 0.5 (4.4 g) |

Formulation A (Summer) is comprised of 89.5% (wt.) prototype gel (asphalt, bio-oil, PA-14, Min-U-Gel G35 Clay); 4% fine fiber (Technocel TC 1004/1005); 6% functional filler (Sil-Cell); and 0.5% wet surface additive (LOF6500).

Formulation B (Winter) is comprised of 90% (wt.) prototype gel (asphalt, bio-oil, PA-14, Min-U-Gel G35 Clay); 2% coarse fiber (Technocel TC 2004); 2% fine fiber (Technocel TC 1004/1005); 6% functional filler (Sil-Cell); and 0.5% wet surface additive (LOF 6500). It should be noted that except for the bio-based solvent, all raw materials may have technical substitutes. These alternate materials might require adjustment in the formula percentages.

The two compositions included 70 parts AC-20 and 30 parts bio-based solvent. Prior to adding the surfactant, the mixture of the asphalt and the solvent was heated to approximately 60-70° C. Using a small Hobart mixer on slow speed, the surfactant (PA-14 Acetate) was then added to the mixture while paddle agitating. This mixture was mixed/blended for 5 minutes. Next, the clay (Min-U-Gel) was slowly added, and a gel was formed by mixing the ingredients for 30+/−5 minutes. The resulting prototype gel was comprised of 59.5% (wt.) of asphalt, 25.5% solvent, 13.3% clay; and 1.7% surfactant.

For formulation B, after gel formation, fibers, a functional filler, and a wet surface adhesion additive were added. To 400 g of gel, coarse fibers were slowly added while paddle mixing for 15+/−5 minutes. Next, fine fibers were slowly added with mixing for 30+/−5 minutes. A functional filler and an adhesion additive were thereafter added to the composition.

For Formulations A and B, the preferable clay:surfactant ratio was determined at approximately 8:1. Table 2 shows the properties of these two formulations, 24 hours after preparation.

TABLE 2

Formulation Properties at 24 Hours
ASTM D 4586 Requirements

|  | A | B |
|---|---|---|
| Sag Test (Behavior at) (D 4586) 60° C. | No sag/no slip | No sag/no slip |
| Pliability (D4586) 0° C. | No cracking (pass) | No cracking (pass) |
| Moisture % (D 95) | 1.9 | 1.7 |
| Workability (D 4586) | Easily spread | Easily spread |
| Other Properties | | |
| Cone Pen, dmm (D 217) 10° C. | 260 | 262 |
| Cone Pen, dmm (D 217) 25° C. | 303 | 318 |
| Cone Pen, dmm (D 217) 60° C. | 330 | 357 |
| Adhesion to Damp, Wet Surfaces (D 6511-17) | 97% (pass) | 98% (pass) |
| VOCs by EPA 24 | 0.58 | 0.28 |
| Weight per Gallon (D 6511-6); lbs/gal | 7.7 | 7.8 |
| Outdoor Exposure (1 month) | No slipping, sagging, disbanding; exhibits flexibility | No slipping, sagging, disbanding; exhibits flexibility |
| Adhesion of two shingle pieces | Firm adhesion | Firm adhesion |

ASTM D4586 (Sag Test) provides standard specifications for characteristics of asphalt-free roof cement compositions. These specifications cover two types and two classes of asbestos-free asphalt roof cement consisting of an asphalt base, volatile petroleum solvents, and mineral and/or other stabilizers, mixed to a smooth, uniform consistency suitable for trowel application to roofing and flashing. Type I is made from asphalts characterized as self-healing, adhesive, and ductile and is used for application to essentially dry surfaces. Type II is made from asphalt characterized by high softening point and relatively low ductility, and is used for application to damp, wet, or underwater surfaces. The roof cements must comply with composition limits for water, nonvolatile matter, mineral and/or other stabilizers, and bitumen (asphalt). They must also meet physical requirements such as uniformity, workability, and pliability and behavior at given temperatures. The present invention can provide either Type I or Type II asphalts.

As shown in Table 2, both formulations were tested 24 hours after preparation for their conformity to ASTM D4586 requirements. Both formulations showed no sag and no slip when given a sag test (behavior at 60° C.) (D 4586). Both formulations also showed no cracking when tested for pliability (D 4586) at 0° C. Both formulations were easily spread when tested for workability (D 4586). Accordingly, Formulations A and B complied with the ASTM D4586 performance properties of $Sag_{60° C.}$, $Pliability_{0° C.}$, and Workability$_{25° C.}$ Formulations A and B showed 1.9% (wt.) water and 1.7% (wt.) water, respectively, when tested for moisture (ASTM D4586-3% maximum allowable moisture). Therefore, these formulations also complied with moisture content requirements of ASTM D4586.

At 24 hours after manufacture, Formulations A and B were observed and appeared smooth, buttery and wet. They exhibited consistency, texture and properties meeting existing industry-accepted standards for VOC containing products. Specifically, Formulations A and B exhibited excellent shelf-life, stability and field performance after one-month of exposure.

Cone penetration tests were also used to evaluate the consistency of the formulations over the range of temperatures. These tests measure the relative hardness of a material. The results are shown in Table 2. The formulations exhibit slightly different viscosity profiles measured over the relevant industry standard expected application and exposure temperatures, 10-60° C. Accordingly, they may alternately be used as winter and summer grades—the consistency of Formulation A appears to be appropriate for a summer grade, while the consistency of Formulation B appears to be appropriate for a winter grade.

Formulation A showed 97% adhesion to damp, wet surfaces, while Formulation B showed 98% adhesion to damp, wet surfaces. These results meet the requirements of ASTM D6511-17. After one month of outdoor exposure, both formulations showed no slipping, sagging or disbanding, and exhibited flexibility.

Different test protocols may be utilized to determine the VOC content of a material. EPA 24 (U.S. Environmental Protection Agency Technology Transfer Network Emission Measurement Center Method 24) is the preferred measure of VOC content in the composition as it excludes ingredients exempted by regulatory authorities. EPA24 is an indirect measurement of the VOC content of coatings, wherein the non-volatile content of a coating is determined by drying a known weight of coating and determining the amount of dry film left (this is the non-volatile portion). Next, the volatile fraction of sample (including water) is determined by subtracting the non-volatile portion from the initial weight of sample. The amount of water and exempt solvents in the coating are determined, and these values are subtracted from the volatile matter, leaving what is considered to be the amount of VOCs. EPA 24 calculates volatility by converting weight percent loss at the end of 60 minutes at 110° C. in a forced draft oven into VOC content. A volatile compound is defined as a compound that evaporates more than 95% by weight within six months under ambient evaporation testing conditions. A non-volatile compound is defined as a compound that evaporates less than five percent by weight in six months under ambient evaporation testing conditions. Alkyl alkanolamine, methyl palmitate, soy oil and glycerol are all non-volatile compounds. As shown in Table 2, using the EPA 24 test, the subject compositions yielded VOC content of 0.58% and 0.28%, respectfully. Such results are considered to be VOC-free.

Both formulations were consistent in stability testing conducted at 1 hour, 24 hours, 1 week and 4 weeks after manufacture, with scores of: Appearance—black; Consistency—thick, smooth and buttery consistency; No separation; and Coning—yes. Table 3 below shows additional properties measured 4 weeks after manufacture.

TABLE 3

Stability Study

| | A | B |
|---|---|---|
| Properties after 4 weeks | | |
| Sag Test (Behavior at (D 4586) 60° C. | No sag/no slipping | No sag/no slipping |
| Pliability (D 4586) (0° C.) | No cracking | No cracking |
| Moisture (D 95) % | 1.5 | 1.5 |
| Workability (D 4586) | Easily spread | Easily spread |
| Cone Pen, dmm (D 217) 10° C. | 262 | 256 |
| Cone Pen, dmm (D 217) 25° C. | 300 | 297 |
| Cone Pen, dmm (D 217) 60° C. | 336 | 328 |

As shown in Table 3, testing confirmed that after 4 weeks, the formulations met the requirements of ASTM D4586 and D95 by demonstrating no sag, no slipping, and no cracking and moisture levels of 1.5%. Testing also showed that the formulations were easily spread when tested for workability.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. It is understood that various omissions or substitutions of equivalents are contemplated as circumstance may suggest or render expedient, but is intended to cover the application or implementation without departing from the spirit or scope of the claims of the present invention.

What is claimed is:

1. An asphalt-based roof coating composition consisting of:
   (a) asphalt;
   (b) a VOC free solvent;
   (c) clay;
   (d) a gelling surfactant;
   (e) fibers; and
   (f) a wet surface adhesion additive
   wherein the composition is suitable as a roofing cement and wherein the composition exhibits at least 97% adhesion to a wet surface when measured in accordance with ASTM D6511, section 17.

2. The composition of claim 1, wherein the asphalt is AC-20 (Performance Grade 64-22).

3. The composition of claim 1, wherein the asphalt comprises about 45% to about 65% of the composition and the solvent comprises about 14% to about 29% of the composition.

4. The composition of claim 1, wherein the solvent comprises biodiesel.

5. The composition of claim 4, wherein the biodiesel is derived from soybean oil.

6. The composition of claim 1, wherein the clay is a medium-swell clay.

7. The composition of claim 6, wherein the clay is attapulgite clay and comprises about 9% to about 13% of the composition.

8. The composition of claim 1, wherein the fibers comprise about 2% to about 9% of the composition, and included fine fibers, coarse fibers or a combination of fine and coarse fibers.

9. The composition of claim 1, wherein the composition satisfies the requirements for Pliability at 0° C. set forth in ASTM D4586, section 6.4 when measured 24 hours after manufacture.

10. The composition of claim 1, wherein the composition satisfies the requirements set forth in ASTM D4586 for Workability (ASTM D4586, section 6.2) and Behavior at 60° C. (ASTM D4586, section 6.3) when measured 4 weeks after manufacture.

11. The composition of claim 1, wherein the composition does not slip, sag or disband on a vertical surface after one month of outdoor exposure.

12. The composition of claim 1, wherein the composition is able to adhere two shingle pieces to one another.

13. A method of filling a joint or crack on a building surface, the method comprising applying a composition of claim 1 to the building surface with a trowel or caulk gun dispenser.

14. The method of claim 13, wherein the building surface is a roof material, roof penetration, parapet wall, flashing or gutter.

15. A method of waterproofing a building surface, the method comprising applying a composition of claim 1 to the building surface.

16. The method of claim 15, wherein the building surface is a roof material, wall, footing or foundation.

* * * * *